(12) United States Patent
Liu et al.

(10) Patent No.: US 8,130,875 B2
(45) Date of Patent: Mar. 6, 2012

(54) METHOD FOR ESTIMATING CHANNEL RESPONSE IN A WIRELESS COMMUNICATIONS NETWORK BASED ON PILOT SIGNALS

(75) Inventors: Qingwen Liu, San Jose, CA (US); Genyuan Wang, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 693 days.

(21) Appl. No.: 11/929,983

(22) Filed: Oct. 30, 2007

(65) Prior Publication Data

US 2008/0159455 A1 Jul. 3, 2008

Related U.S. Application Data

(60) Provisional application No. 60/874,209, filed on Dec. 11, 2006.

(51) Int. Cl.
*H04L 27/06* (2006.01)
(52) U.S. Cl. ...................................................... 375/340
(58) Field of Classification Search .................. 370/241, 370/252, 491, 500; 375/224, 285, 340, 346, 375/347
See application file for complete search history.

(56) References Cited

U.S. PATENT DOCUMENTS

| | | | |
|---|---|---|---|
| 7,733,989 B2 * | 6/2010 | Guey | 375/340 |
| 2003/0043732 A1 | 3/2003 | Walton et al. | |
| 2003/0123559 A1 | 7/2003 | Classon et al. | |
| 2006/0203932 A1 * | 9/2006 | Palanki et al. | 375/295 |
| 2006/0280262 A1 * | 12/2006 | Malladi | 375/299 |
| 2008/0165901 A1 * | 7/2008 | Krupka | 375/340 |
| 2010/0166118 A1 * | 7/2010 | Mantravadi et al. | 375/340 |

OTHER PUBLICATIONS

PCT International Search Report and Written Opinion of the International Searching Authority, Mar. 7, 2008.

* cited by examiner

*Primary Examiner* — Jean B Corrielus

(57) ABSTRACT

The present invention discloses a method for estimating a channel response of data subcarriers in a wireless communications network. The method comprises estimating a first plurality of channel responses of pilot subcarriers carrying pilot signals at the time instance using pilot signals, generating a pseudo time instance for pilot subcarriers according to a predetermined rule, approximating a second plurality of channel responses at the pseudo time instance using the first plurality of channel responses, computing a rate of change in the channel response using the first and second plurality of channel responses, calculating a third plurality of channel responses of pilot subcarriers carrying data at the time instance using the first plurality of channel responses and the rate of change in the channel response, estimating the channel response of the data subcarriers from the first and third plurality of channel responses using a predetermined conventional two-dimensional channel estimation algorithm.

16 Claims, 3 Drawing Sheets

METHOD FOR ESTIMATING CHANNEL RESPONSE IN A WIRELESS COMMUNICATIONS NETWORK BASED ON PILOT SIGNALS

CROSS REFERENCE

The present application claims the benefit of U.S. Provisional Application No. 60/874,209, which was filed on Dec. 11, 2006.

BACKGROUND

Channel estimation for receivers in a wireless communications network employing Orthogonal Frequency-Division Multiplexing (OFDM network) is accomplished by using training or pilot signals. Using training signals for channel estimation requires transmitting training signals with all subcarriers of an OFDM symbol regularly, which results in a large amount of overhead. Therefore, most high data rate wireless communications networks do not employ this method.

On the other hand, a pilot signal only uses a portion of the subcarriers of an OFDM symbol; consequently, it is preferred to use pilot signals for channel estimation. For example, in a burst mode transmission, pilot signals transmitted on some predetermined subcarriers are inserted into a data stream. These pilot signals facilitate channel tracking and channel estimation for coherent detection.

Pilot signals are distributed evenly or unevenly in the time and frequency domains, i.e. they occupy some subcarriers at some of the times evenly or unevenly. In a wireless communications network equipped with multiple antennas, having an antenna adds another dimension for the distribution of pilot signals. Specifically, the pilot signals occupy some subcarriers at some of the times on some of the antennas. Moreover, conventional channel estimation algorithms based on evenly-distributed pilot signals are less effective than those based on unevenly-distributed pilot signals, such as WiMAX.

OFDM subcarriers are categorized into pilot subcarriers, which can carry pilot signals, and data subcarriers, which can only carry data. The channel response of a pilot subcarrier carrying a pilot signal is estimated using the pilot signal, and it is highly correlated with that of an adjacent data subcarrier carrying data. Therefore, the channel response of a data subcarrier can be estimated based on that of one of its adjacent pilot subcarriers.

Generally, a channel estimation algorithm using pilot signals is implemented by using a two-dimensional interpolation method. Furthermore, a two-dimensional interpolation channel estimation algorithm can be implemented by applying a one-dimensional interpolation channel estimation algorithm iteratively for a variable number of times. The one-dimensional interpolation channel estimation algorithm is based on a function of one variable, which is frequency, time, or a third variable comprised of frequency and time. However, for a mobile wireless communications network that has limited unevenly-distributed pilot signals, employing the above one-dimensional algorithm iteratively does not produce an accurate estimation of the channel response of a data subcarrier.

Conventional channel estimation algorithms may incorporate some type of decision feedback mechanism to improve the accuracy of the channel estimation. However, decision feedback mechanisms are based on training signals or evenly distributed pilot signals, and they are not applicable to wireless communication systems such as WiMAX.

As such, what is desired is a method for channel estimation based on unevenly-distributed pilot signals using generalized two-dimensional channel estimation algorithms and a decision feedback mechanism.

SUMMARY

The present invention discloses a method for estimating a channel response of a data subcarrier in a wireless communications network. The method comprises estimating a first plurality of channel responses of the plurality of pilot subcarriers carrying pilot signals at the time instance using the pilot signals, generating a pseudo time instance for the plurality of pilot subcarriers according to a predetermined rule, approximating a second plurality of channel responses at the pseudo time instance using the first plurality of channel responses, computing a rate of change in the channel response using the first plurality of channel responses and the second plurality of channel responses, calculating a third plurality of channel responses of the plurality of pilot subcarriers carrying data at the time instance using the first plurality of channel responses and the rate of change in the channel response, and estimating the channel response of the data subcarrier from the first plurality of channel responses and the third plurality of channel responses using a predetermined conventional two-dimensional channel estimation algorithm.

The construction and method of operation of the invention, however, together with additional objects and advantages thereof, will be best understood from the following description of specific embodiments when read in connection with the accompanying drawings.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

The present invention discloses a method for channel estimation based on unevenly-distributed pilot signals using a generalized two-dimensional interpolation channel estimation algorithm and a decision feedback mechanism. The method is applicable to a wireless communications network with fading channels and evenly- or unevenly-distributed pilot signals.

The generalized two-dimensional interpolation channel estimation algorithm employs a complementary process that generates supplementary channel information, which facilitates the channel estimation process and improves the accuracy of the estimation. Henceforward the two-dimensional interpolation channel estimation algorithm will be referred to as the 2-D algorithm and the one-dimensional interpolation channel estimation algorithm as the 1-D algorithm.

In an OFDMA network, a communication channel comprises a plurality of subcarriers. Furthermore, an OFDM symbol comprises a plurality of subcarriers transmitted in a fixed time interval (time instance). A predetermined number of subcarriers make up a slot, which is the basic unit of resource allocation, and one or more slots form a transmission unit. The subcarriers in a slot are further separated into two groups: data subcarriers and pilot subcarriers. A pilot subcarrier carries data and a pilot signal at different time instances and a data subcarrier carries data at all times.

Figure 1:
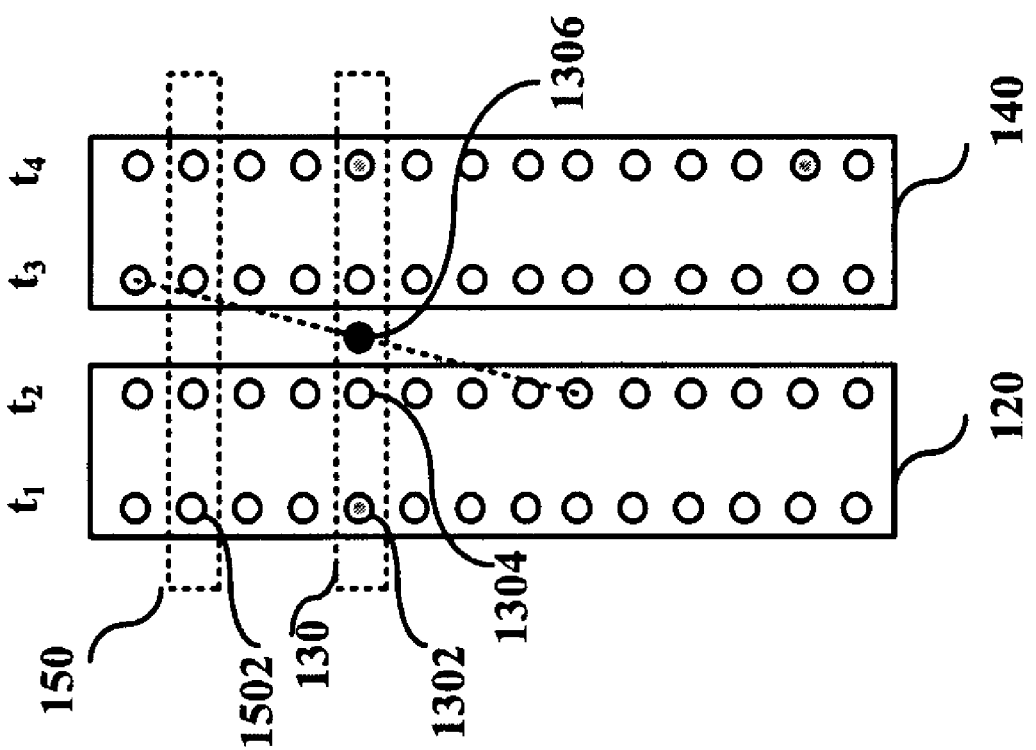
FIG. 1 is a diagram illustrating two slots in a two-dimensional space of time and frequency.

FIG. 1 is a diagram illustrating two slots in a two-dimensional space of time and frequency. A slot 120 comprises subcarriers of OFDM symbols at time instances $t_1$ and $t_2$ while a slot 140 comprises subcarriers of OFDM symbols at time instances $t_3$ and $t_4$. In other words, slots 120 and 140 represent signals transmitted in four OFDM symbols by a wireless station at time instances $t_1$, $t_2$, $t_3$, and $t_4$. Slots 120 and 140 are filled with circles representing subcarriers in a two-dimensional diagram of time and space.

A pilot subcarrier 130 is shown as a shaded circle 1302 when it carries a pilot signal at time instance $t_1$, as an empty circle 1304 when it carries a data signal at $t_2$, and as a solid circle 1306 at a pseudo time instance. In addition, an empty circle 1502 represents a data subcarrier 150 carrying a data signal at time instances $t_1$.

The generalized 2-D algorithm is used to estimate the channel response of the data subcarrier 150 and that of the pilot subcarrier 130 data signals in a transmission unit. In order to demodulate and decode receiving signals of the transmission unit, a wireless receiver needs channel response information about all subcarriers in slots 120 and 140.

Figure 2:
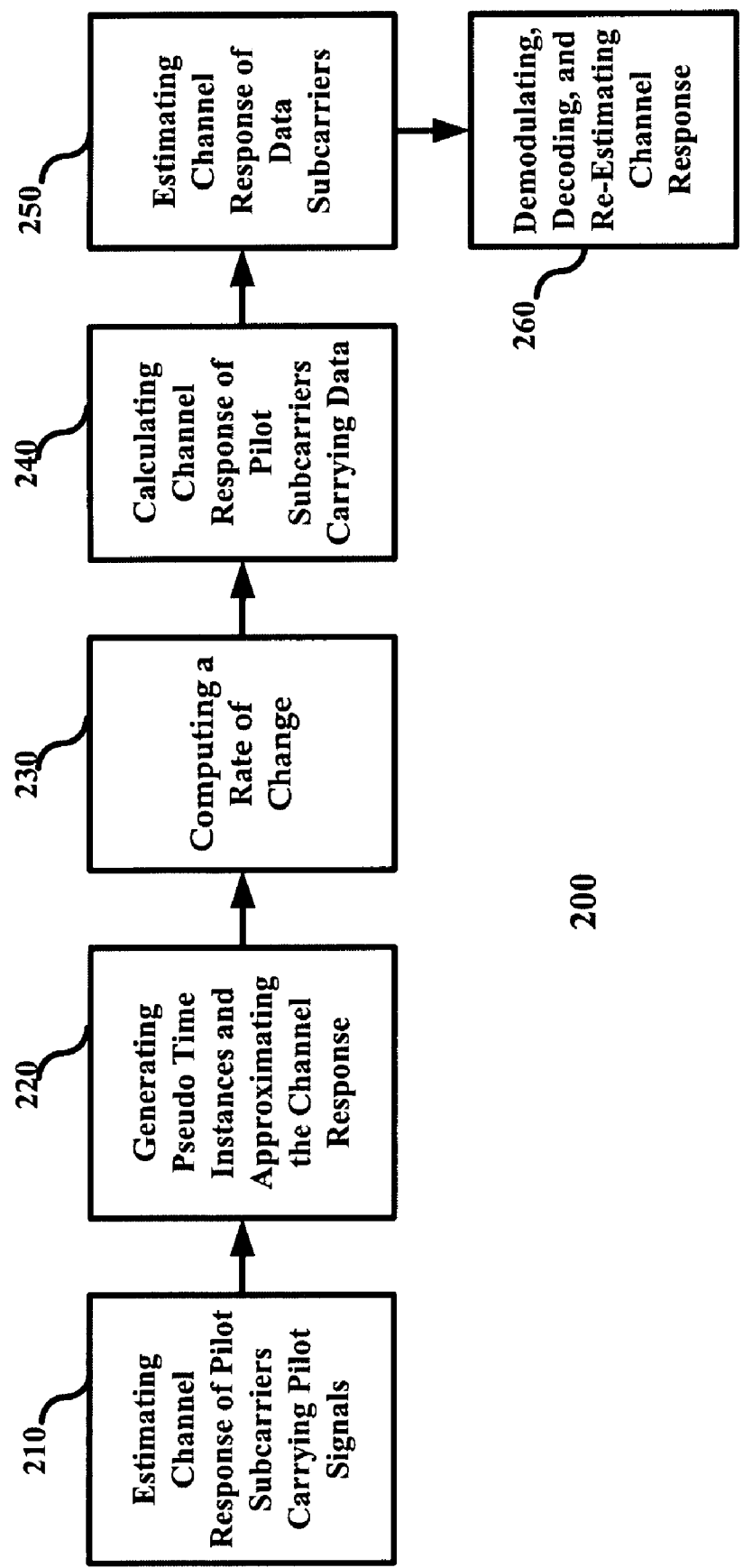
FIG. 2 is a flow diagram depicting a method for channel estimation in accordance with one embodiment of the present invention.

FIG. 2 is a flow diagram depicting a method for channel estimation in accordance with one embodiment of the present invention. In step 210, the receiver of a wireless communications network initiates the demodulating and decoding of a receiving signal in a transmission unit. Specifically, the channel response of pilot subcarrier that carries a pilot signal at a plurality of time instances is estimated using the pilot signals.

In step 220, one or more pseudo time instances for the first pilot subcarrier are generated according to a predetermined rule. The channel response of the first pilot subcarrier at a pseudo time instance is estimated using channel responses of both a second pilot subcarrier carrying a pilot signal at one time instance and a third pilot subcarrier carrying a pilot signal at another time instance. The estimation of the channel response uses a 1-D algorithm.

In step 230, the rate of change in the channel response is estimated using the channel response of the pilot subcarrier carrying a pilot signal at a time instance and the channel response of the corresponding pilot subcarrier at the pseudo-time instance. Furthermore, in step 240, the channel response of the first pilot subcarrier carrying data at one time instance is estimated using the channel response of the first pilot subcarrier carrying a pilot signal at another time instance and the rate of change in the channel response.

In step 250, the channel response of a data subcarrier at a time instance is estimated with a predetermined conventional two-dimensional channel estimation algorithm using the channel response of a pilot subcarrier. In step 260, the receiving signal is demodulated and decoded, and the channel information derived from the decoded data is sent to the channel estimation function of the wireless receiver. The generalized 2-D algorithm disclosed in the present invention and the channel information retrieved from a decision feedback mechanism are used in the channel re-estimation process.

In one embodiment of the method disclosed in the present invention, the channel re-estimation process employs the channel information retrieved from a decision feedback mechanism. This channel information can be used alone or combined with the channel information previously acquired according to a predetermined rule in order to generate enhanced channel information. In addition, the channel information retrieved from a decision feedback mechanism includes soft and hard information. Channel information, such as the probability of errors in the demodulated signal, is soft information while the presence of a cyclic redundant code error (CRC) in the decoded data is hard information.

In another embodiment of the method disclosed in the present invention, predetermined weights are applied to the channel information retrieved from a decision feedback mechanism and the channel response of the pilot subcarriers. The channel re-estimation process uses the weighted channel information. One exemplary weight assignment is to assign a weight to the information based on the reliability of the information.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

Figure 3:
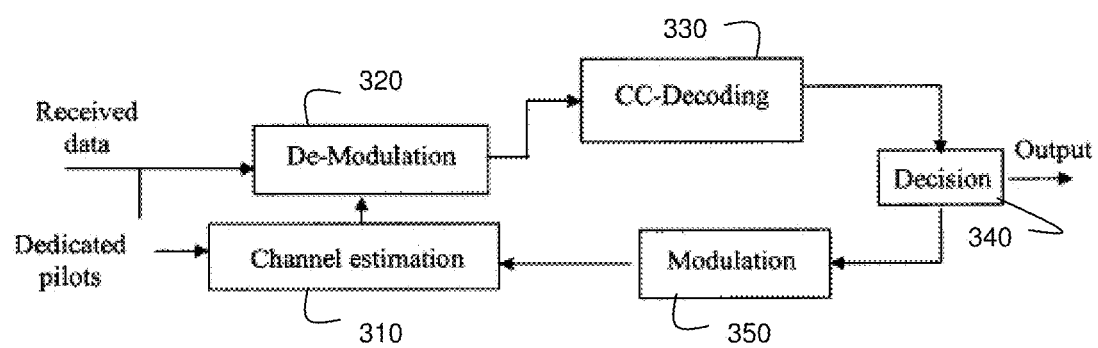
FIG. 3 shows an example feedback channel estimation method.

The structure of the proposed decision feedback channel estimation method is shown in FIG. 3. The proposed decision feedback channel estimation method contains initial channel estimation 310, and a decision feedback mechanism 340 for channel re-estimation. A generalized two dimensional (2-D) interpolation is applied for the initial channel estimation 310. The generalized 2-D interpolation does not require the pilot signals with regular distribution in channel media, such as time and frequency. The generalized 2-D interpolation can be implemented with one-dimensional (1-D) interpolations at some carefully chosen "channel point" which are used for channel changing estimation, estimation of channel changing in one direction (time or frequency), certain sub-channels or tones estimations based on the estimated channel changing, and several other 1-D interpolations.

Certain "channel points" are estimated in the time-frequency plane. These "channel points" might be the real or virtual sub-channels or tones. 1-D interpolation is done in the time-frequency plane. Channel changing or variation between OFDMA symbols are estimated by pilots and the estimated "channel points." Certain sub-channels or tones in the time-frequency channel plane are estimated by using the pilots.

Based on the estimated channel information, the received data in FIG. 3 is demodulated at 320 and decoded at 330. After the demodulation and decoding, at 340, a decision is made at the receiver that either outputs the decoded data information or feeds the decoded data information back to perform channel estimation 310 again. At 340, the receiver may also decide to send the message back to the transmitter to re-transmit the data again or to discard the received data.

What is claimed is:

1. A method comprising:
in a wireless receiver of a wireless station, receiving a transmission comprising a first subcarrier, a second subcarrier and a third subcarrier, wherein the first, second and third subcarriers are configured to carry either data signals or pilot signals at time instances;
estimating a channel response of the second subcarrier carrying a pilot signal at one time instance;
estimating a channel response of the third subcarrier carrying a pilot signal at another time instance;
estimating a channel response of the first subcarrier carrying a pilot signal at one of a plurality of pseudo time instances using the channel response of the second subcarrier at the one time instance and the channel response of the third subcarrier at the other time instance, wherein the one of the plurality of pseudo time instances represents a time between a time instance of the second subcarrier and a time instance of the third subcarrier;
estimating a channel response rate of change using the estimated channel response of the first subcarrier at the one of the plurality of pseudo time instances and the estimated channel response of the second subcarrier; and
estimating a channel response of the first subcarrier carrying a data signal at one time instance using a channel response of the first subcarrier carrying a pilot signal at another time instance and the channel response rate of change.

2. The method of claim 1, wherein each of the first, second and third subcarriers carry evenly distributed pilot signals.

3. The method of claim 1, wherein each of the first, second and third subcarriers carry unevenly distributed pilot signals.

4. The method of claim 1, wherein estimating the channel response of the first subcarrier carrying the pilot signal at one of the pseudo time instances comprises estimating the channel response using a one-dimensional interpolation channel estimation algorithm.

5. The method of claim 1, wherein estimating the channel response of the first subcarrier carrying the data signal at the one time instance comprises:
at the wireless receiver, demodulating and decoding a transmission unit comprising the first, second and third subcarriers to derive channel information from demodulated and decoded data information of the signals received at the wireless receiver;
using a decision feedback to determine whether to send the channel information derived from the decoded data information for estimating the channel response of the first subcarrier carrying the data signal at the one time instance;
retrieving channel information of the first, second and third subcarriers from the decision feedback; and
re-estimating the estimated channel response for the first subcarrier carrying the data signal at the one time instance and the estimated channel response for the second subcarrier carrying the pilot signal.

6. The method of claim 5, wherein the channel information of the first, second and third subcarriers includes soft information comprising a probability of errors.

7. The method of claim 5, wherein the channel information of the first, second and third subcarriers includes hard information comprising cyclic redundant code errors.

8. The method of claim 5, wherein re-estimating comprises re-estimating the channel information of the first, second and third subcarriers retrieved by the decision feedback.

9. The method of claim 6, wherein re-estimating comprises re-estimating the channel information from the decision feedback based on the estimated rate of change.

10. The method of claim 5, wherein re-estimating further comprises:
applying weights to the channel information retrieved from the decision feedback to produce weighted channel information; and
re-estimating the channel response of the first subcarrier carrying the data signal using the weighted channel information.

11. The method of claim 10, further comprising assigning the weights based on reliability of the channel information.

12. A method comprising:
in a wireless receiver of a wireless station, receiving a transmission comprising a first subcarrier, a second subcarrier and a third subcarriers, wherein the first, second and third subcarriers are configured to carry either data signals or pilot signals at time instances;
estimating a channel response of the second subcarrier carrying a pilot signal at one time instance;
estimating a channel response of the third subcarrier carrying a pilot signal at another time instance;
estimating a channel response of the first subcarrier carrying a pilot signal at one of a plurality of pseudo time instances using the channel response of the second subcarrier at the one time instance and the channel response of the third subcarrier at the other time instance, wherein the one of the plurality of pseudo time instances represents a time between a time instance of the second subcarrier and a time instance of the third subcarrier;
estimating a channel response rate of change using the estimated channel response of the first subcarrier at the one of the plurality of pseudo time instances and the estimated channel response of the second subcarrier at the one time instance;
estimating a channel response of the first subcarrier carrying a data signal at one time instance by using a channel response of the first subcarrier carrying a pilot signal at another time instance and the channel response rate of change;
demodulating and decoding a transmission unit comprising the first, second and third plurality subcarriers, and retrieving channel information of the first, second and third subcarriers using decision feedback from the decoding of the transmission unit; and
applying weights to the channel information retrieved using the decision feedback to produce weighted channel information.

13. The method of claim 12, wherein estimating the channel response of the first subcarrier carrying the pilot signal at one of the pseudo time instances comprises estimating the channel response of the first subcarrier carrying the pilot signals using a one-dimensional interpolation channel estimation algorithm.

14. The method of claim 12, wherein the channel information of the first, second and third subcarriers includes soft information comprising a probability of errors.

15. The method of claim 12, wherein the channel information of the first, second and third subcarriers includes hard information comprising cyclic redundant code errors.

16. The method of claim 12, further comprising assigning the weights based on reliability of the channel information.

* * * * *